US011501065B2

United States Patent
Duong et al.

(10) Patent No.: US 11,501,065 B2
(45) Date of Patent: Nov. 15, 2022

(54) SEMANTIC PARSER INCLUDING A COARSE SEMANTIC PARSER AND A FINE SEMANTIC PARSER

(71) Applicant: Oracle International Corporation, Redwood Shores, CA (US)

(72) Inventors: Thanh Long Duong, Seabrook (AU); Mark Edward Johnson, Castle Cove (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 16/992,343

(22) Filed: Aug. 13, 2020

(65) Prior Publication Data
US 2021/0073465 A1   Mar. 11, 2021

Related U.S. Application Data

(60) Provisional application No. 62/898,683, filed on Sep. 11, 2019.

(51) Int. Cl.
*G06F 40/205* (2020.01)
*G10L 15/22* (2006.01)
(Continued)

(52) U.S. Cl.
CPC .......... *G06F 40/205* (2020.01); *G06F 40/289* (2020.01); *G06N 3/08* (2013.01); *G10L 13/00* (2013.01); *G10L 15/22* (2013.01)

(58) Field of Classification Search
CPC ............................. G06F 40/30; G06F 40/211
See application file for complete search history.

(56) References Cited

U.S. PATENT DOCUMENTS 8,914,279 B1* 12/2014 Petrov .................. G06F 40/211
704/9
9,026,431 B1* 5/2015 Moreno Mengibar . G06F 40/30
704/9
(Continued)

OTHER PUBLICATIONS

Dong, Li, and Mirella Lapata. "Coarse-to-fine decoding for neural semantic parsing." arXiv preprint arXiv:1805.04793 (2018). (Year: 2018).*

(Continued)

*Primary Examiner* — Jialong He
(74) *Attorney, Agent, or Firm* — Kilpatrick Townsend & Stockton LLP

(57) ABSTRACT

Techniques for improving a semantic parser of a dialog system, by breaking the semantic parser into a coarse semantic parser and a fine semantic parser, are described. A method described herein includes accessing an utterance received in a dialog system. The utterance is a text-based natural language expression. The method further includes applying a coarse semantic parser to the utterance to determine an intermediate logical form for the utterance. The intermediate logical form indicates one or more intents in the utterance. The method further includes applying a fine semantic parser to the intermediate logical form to determine a logical form for the utterance. The logical form is a syntactic expression of the utterance according to an established grammar, and the logical form includes one or more parameters of the one or more intents. The logical form can be used to conduct a dialog with a user of the dialog system.

13 Claims, 9 Drawing Sheets

(51) Int. Cl.
   *G06F 40/289*   (2020.01)
   *G06N 3/08*     (2006.01)
   *G10L 13/00*    (2006.01)

(56) References Cited

U.S. PATENT DOCUMENTS

| | | | |
|---|---|---|---|
| 2017/0011183 A1* | 1/2017 | Valverde, Jr. | G06F 40/169 |
| 2017/0278514 A1* | 9/2017 | Mathias | G10L 15/22 |
| 2018/0157642 A1* | 6/2018 | Matskevich | G06F 40/284 |

OTHER PUBLICATIONS

Shen, Yilin, et al. "User Information Augmented Semantic Frame Parsing using Coarse-to-Fine Neural Networks." arXiv preprint arXiv:1809.06559 (2018). (Year: 2018).*

Duong, Long, et al. "Active learning for deep semantic parsing." Proceedings of the 56th Annual Meeting of the Association for Computational Linguistics (vol. 2: Short Papers). 2018. (Year: 2018).*

Kamath, Aishwarya, and Rajarshi Das. "A survey on semantic parsing." arXiv preprint arXiv:1812.00978 (2018). (Year: 2018).*

Petrov, Slav. Coarse-to-fine natural language processing. Springer Science & Business Media, 2011. (Year: 2011).*

Luong, Minh-Thang, et al. "Multi-task sequence to sequence learning." arXiv preprint arXiv:1511.06114 (2016). (Year: 2016).*

* cited by examiner

US 11,501,065 B2

SEMANTIC PARSER INCLUDING A COARSE SEMANTIC PARSER AND A FINE SEMANTIC PARSER

CROSS-REFERENCE TO RELATED APPLICATIONS

The present disclosure claims priority to U.S. Provisional Application Ser. No. 62/898,683 for "Techniques for an Improved Semantic Parser Including a Coarse Parser and a Fine Parser," filed Sep. 11, 2019, which is incorporated by reference herein in its entirety.

TECHNICAL FIELD

The present disclosure relates to dialog systems and, more particularly, to techniques for determining an improved semantic parser or for using an improved semantic parser in a dialog system, the improved semantic parser including a coarse semantic parser and a fine semantic parser used together to determine an intermediate logical form based on an utterances and to determine a logical form based on the intermediate logical form and the utterance.

BACKGROUND

An increasing number of devices now enable users to interact with the devices directly using voice or spoken speech. For example, a user can speak to such a device in a natural language, and in doing so, the user can ask a question or make a statement requesting an action to be performed. In response, the device performs the requested action or responds to the user's question using audio output. Since interacting directly using voice is a more natural and intuitive way for humans to communicate with their surroundings, the popularity of such speech-based systems is growing at an astronomical rate.

BRIEF SUMMARY

The present disclosure relates to techniques for determining an improved semantic parser for a dialog system and for using the improved semantic parser in a dialog system, where the improved semantic parser includes a coarse semantic parser and a fine semantic parser in series. In some embodiments, the coarse semantic parser maps an utterance to an intermediate logical form, and the fine semantic parser maps the utterance and the intermediate logical form to a logical form representing the utterance. The intermediate logical form may act as a template for the logical form or as some other intermediate state, or intermediate expression, between the utterance and the logical form.

In some embodiments, one or both of the coarse semantic parser and the fine semantic parser are machine learning models. The coarse semantic parser may be trained with a first set of tuples, each such tuple including an utterance and a corresponding intermediate logical form. During training, the utterance is labeled as input, and the logical form is labeled as output. Given this training, the coarse semantic parser learns to map an utterance to an intermediate logical form. The fine semantic parser may be trained with a second set of tuples, each such tuple including an utterance, an intermediate logical form, and a logical form. During training, the utterance and the intermediate logical form are labeled as input, and the logical form is labeled as output.

Given this training, the fine semantic parser learns to map an utterance and a corresponding intermediate logical form to a logical form.

During operation of a dialog system, the coarse semantic parser may receive an utterance representing speech input and may determine an intermediate logical form based on the utterance. The fine semantic parser may receive the utterance as well as the intermediate logical form determined by the coarse parse and, based on that input, may determine a logical form representing the utterance. This logical form may be used to achieve a dialog with the user who provided the speech input.

The foregoing, together with other features and embodiments will become more apparent upon referring to the following specification, claims, and accompanying drawings.

DETAILED DESCRIPTION

Figure 1:
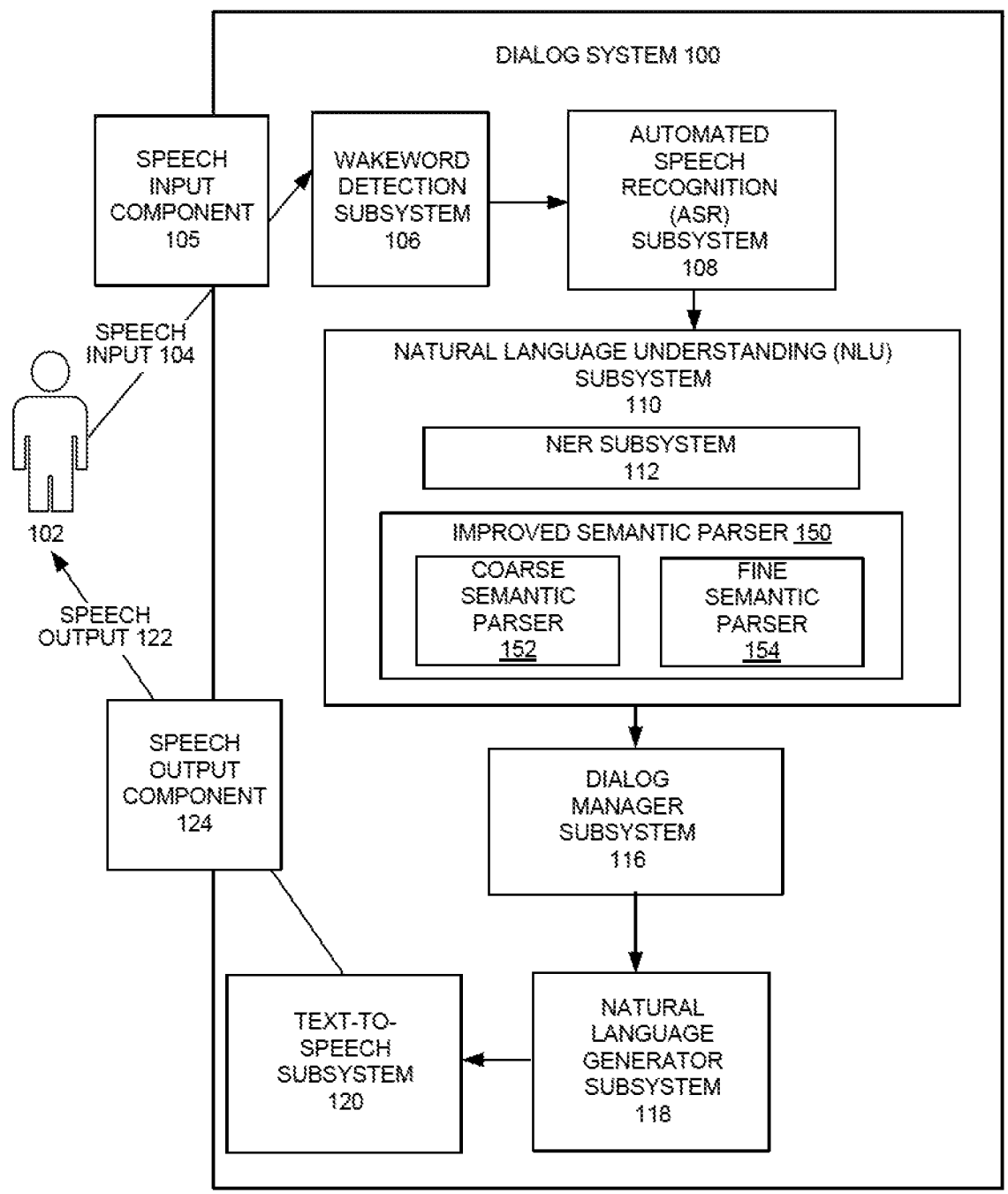
FIG. 1 is a diagram of a dialog system incorporating a coarse semantic parser and a fine semantic parser as an improved semantic parser, according to some embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

A voice-enabled system that is capable of having a dialog with a user via speech inputs and audio outputs, also referred to as voice outputs, can come in various forms. For example, such a system may be provided as a stand-alone device, as a digital or virtual assistant, as a voice-capable service, or the like. In each of these forms, the system is capable of receiving speech inputs, understanding the speech inputs, generating responses or taking actions responsive to the speech inputs, and outputting the responses using audio outputs. In certain embodiments, the dialog functionality in such a voice-enabled system is provided by a dialog system or infrastructure ("dialog system"). The dialog system is configured to receive speech inputs, interpret the speech inputs, maintain a dialog, possibly perform or cause one or more actions to be performed based on interpretations of the speech inputs, prepare appropriate responses, and output the responses to the user using audio output.

Conventionally, a dialog system includes various machine learning (ML) models, and a large amount of training data is needed to train the various machine learning models of the dialog system. One of such ML models is a semantic parser subsystem, also referred to as a semantic parser. Generally, the semantic parser receives an utterance representing speech input provided by a user, where the utterance is a textual representation of natural language. The semantic parser maps that utterance to a logical form, which is a syntactic expression of the utterance as translated into a logic-based language conforming to an established grammar and thus parseable by a dialog manager subsystem of the dialog system. The dialog manager subsystem then parses and processes the logical form to determine how to respond.

A conventional semantic parser subsystem is typically a neural network configured to map an utterance to a corresponding logical form. The semantic parser has a difficult task because logical forms can be quite complex or detailed, especially for complex utterances. As utterances become more complex or less like the data used to train the semantic parser, the logical forms generated by the semantic parser during operation of the dialog system can diverge from logical forms that would be deemed accurate. In other words, there exists a data sparsity problem, such that the amount of training data used may not be sufficient for the semantic parser to learn to generate a sufficient distribution of logical forms. This can lead to the dialog manager subsystem receiving an inaccurate input and thus determining a response that is not in line with the speech input represented by the utterance. As a result, the dialog manager subsystem may be unable to achieve a dialog that is useful to a user.

According to some embodiments described herein, however, an improved semantic parser is implemented as a combination of a coarse semantic parser and a fine semantic parser. The coarse semantic parser may map an utterance to a corresponding intermediate logical form, also referred to as a template, and the fine semantic parser may map the utterance and the intermediate logical form to a logical form, which may be appropriate for input to a dialog manager subsystem of a dialog system. In some embodiments, during operation of a dialog system, an utterance is input into the coarse semantic parser, which outputs an intermediate logical form for input along with the utterance into the fine semantic parser, which outputs a logical form.

By utilizing a coarse semantic parser in combination with a fine semantic parser, some embodiments described herein reduce the data sparsity problem, because each of the coarse semantic parser and the fine semantic parser need only learn a smaller distribution of outputs. For instance, there may exist a smaller number of possible intermediate logical forms than logical forms, given that intermediate logical forms may be more generalized than logical forms. Thus, it may be easier for the coarse semantic parser to learn a sufficient distribution of intermediate logical forms than it would be to learn a sufficient distribution of logical forms. Analogously, the work of the fine semantic parser is also reduced compared to a conventional semantic parser because the starting point (i.e., an intermediate logical form) is closer to the desired output of a logical form. More generally, embodiments described herein break the difficult task of determining a logical form from an utterance into two smaller tasks of determining an intermediate logical form from the utterance and determining a logical form from the intermediate logical form and the utterance. Thus, the work of the semantic parser is divided into two parsers, each of which can learn its respective output distribution more effectively, leading to an overall better result.

Referring now to the drawings, FIG. 1 is a diagram of an example of a dialog system 100 using an improved semantic parser 150 that includes a coarse semantic parser 152 and a fine semantic parser 154, according to certain embodiments described herein. The dialog system 100 is configured to receive speech inputs 104, also referred to as voice inputs, from a user 102. The dialog system 100 may then interpret the speech inputs 104. The dialog system 100 may maintain a dialog with a user 102 and may possibly perform or cause one or more actions to be performed based upon interpretations of the speech inputs 104. The dialog system 100 may prepare appropriate responses and may output the responses to the user using voice or speech output, also referred to as audio output. The dialog system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In certain embodiments, the processing performed by the dialog system 100 is implemented by a pipeline of components or subsystems, including a speech input component 105; a wake-word detection (WD) subsystem 106; an automatic speech recognition (ASR) subsystem 108; a natural language understanding (NLU) subsystem 110, which includes a named entity recognizer (NER) subsystem 112 and a semantic parser subsystem 150; a dialog manager (DM) subsystem 116; a natural language generator (NLG) subsystem 118; a text-to-speech (TTS) subsystem 120; and a speech output component 124. The subsystems listed above may be implemented only in software (e.g., using code, a program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input 104 to the wake-word detection subsystem 106.

The wake-word detection (WD) subsystem 106 is configured to listen for and monitor a stream of audio input for input corresponding to a special sound or word or set of words, referred to as a wake-word. Upon detecting the wake-word for the dialog system 100, the WD subsystem 106 is configured to activate the ASR subsystem 108. In certain implementations, a user may be provided the ability to activate or deactivate the WD subsystem 106 (e.g., by pushing a button) to cause the WD subsystem 106 to listen for or stop listening for the wake-word. When activated, or when operating in active mode, the WD subsystem 106 is configured to continuously receive an audio input stream and process the audio input stream to identify audio input, such as speech input 104, corresponding to the wake-word. When audio input corresponding to the wake-word is detected, the WD subsystem 106 activates the ASR subsystem 108.

As described above, the WD subsystem 106 activates the ASR subsystem 108. In some implementations of the dialog system 100, mechanisms other than wake-word detection may be used to trigger or activate the ASR subsystem 108. For example, in some implementations, a push button on a device may be used to trigger the ASR subsystem 108 without needing a wake-word. In such implementations, the WD subsystem 106 need not be provided. When the push button is pressed or activated, the speech input 104 received after the button activation is provided to the ASR subsystem 108 for processing. Additionally or alternatively, in some implementations, the ASR subsystem 108 may be activated upon receiving an input to be processed.

The ASR subsystem 108 is configured to receive and monitor speech input 104 after a trigger or wake-up signal (e.g., a wake-up signal may be sent by the WD subsystem 106 upon the detection of the wake-word in the speech input 104, or the wake-up signal may be received upon the activation of a button) and to convert the speech input 104 to text. As part of its processing, the ASR subsystem 108 performs speech-to-text conversion. The speech input 104 may be in a natural language form, and the ASR subsystem 108 is configured to generate the corresponding natural language text in the language of the speech input 104. This corresponding natural language text is referred to herein as an utterance. For instance, the speech input 104 received by the ASR subsystem 108 may include one or more words, phrases, clauses, sentences, questions, or the like. The ASR subsystem 108 is configured to generate an utterance for each spoken clause and feed the utterances to the NLU subsystem 110 for further processing.

The NLU subsystem 110 receives utterances generated by the ASR subsystem 108. The utterances received by the NLU subsystem 110 from the ASR subsystem 108 may include text utterances corresponding to spoken words, phrases, clauses, or the like. The NLU subsystem 110 translates each utterance, or a series of utterances, to a corresponding logical form.

In certain implementations, the NLU subsystem 110 includes a named entity recognizer (NER) subsystem 112 and a semantic parser subsystem 150. The NER subsystem 112 receives an utterance as input, identifies named entities in the utterance, and tags the utterance with information related to the identified named entities. The tagged utterances are then fed to the semantic parser subsystem 150, which is configured to generate a logical form for each tagged utterance, or for a series of tagged utterances. The logical form generated for an utterance may identify one or more intents corresponding to the utterance. An intent for an utterance identifies an objective of the utterance. Examples of intents include "order pizza" and "find directions." An intent may, for example, identify an action that is requested to be performed. In addition to intents, a logical form generated for an utterance may also identify slots, also referred to as parameters or arguments, for an identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem 110 may use machine learning based techniques, rules, which may be domain specific, or a combination of machine learning techniques and rules to generate the logical forms. The logical forms generated by the NLU subsystem 110 are then fed to the DM subsystem 116 for further processing.

In some embodiments, the semantic parser subsystem 150 of the NLU subsystem 110 includes a coarse semantic parser 152 and a fine semantic parser 154, which together map an utterance to a logical form. The coarse semantic parser 152 receives the utterance, which may have been tagged by the NER subsystem 112, and the coarse semantic parser 152 generates an intermediate logical form corresponding to the utterance. The fine semantic parser 154 receives the utterance and the intermediate logical form and generates a logical form based on the utterance and the intermediate logical form. The logical form determined by the fine semantic parser 154 may correspond to the utterance and, thus, to the speech input 104 of which the utterance is a textual representation.

The DM subsystem 116 is configured to manage a dialog with the user based on logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, or other actions. For example, the DM subsystem 116 is configured to interpret the intents identified in the logical forms received from the NLU subsystem 110. Based on the interpretations, the DM subsystem 116 may initiate one or more actions that it interprets as being requested by the speech inputs 104 provided by the user. In certain embodiments, the DM subsystem 116 performs dialog-state tracking based on current and past speech inputs 104 and based on a set of rules (e.g., dialog policies) configured for the DM subsystem 116. These rules may specify the different dialog states, conditions for transitions between states, actions to be performed when in a particular state, or the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output as audio to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and to respond using speech outputs 122 and, thereby, to maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

Figure 2:
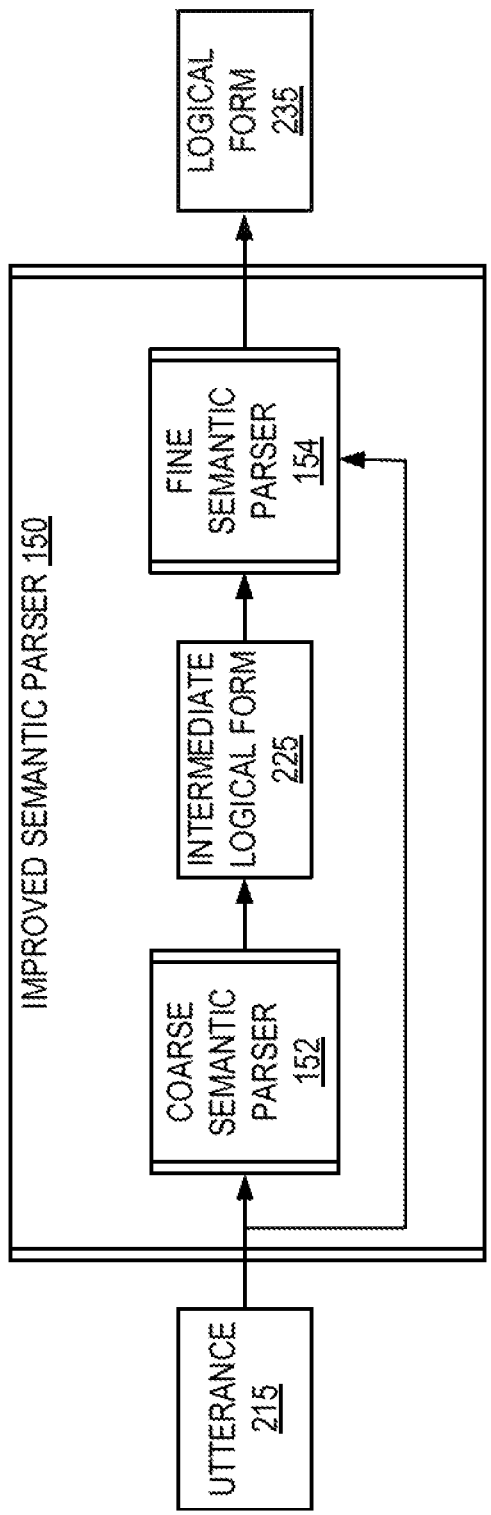
FIG. 2 is a diagram of the improved semantic parser for use in the dialog system, according to some embodiments described herein.

FIG. 2 is a diagram of a semantic parser 150, also referred to herein as an improved semantic parser 150, for use in a dialog system 100, according to some embodiments described herein. The improved semantic parser 150 acts as a semantic parser subsystem of a dialog system 100 in some embodiments, potentially replacing a conventional semantic parser subsystem. As shown in FIG. 2, the improved semantic parser 150 may include two ML models, or two prediction models, which may be connected in series. Specifically, the semantic parser 150 may include a coarse semantic parser 152 and a fine semantic parser 154. According to some embodiments, after training of the coarse semantic parser and the fine semantic parser, the coarse semantic parser 152 maps an utterance 215 to a corresponding intermediate logical form 225, and the fine semantic parser 154 maps the intermediate logical form 225 to a logical form 235. In some embodiments, as shown in FIG. 2, the fine semantic parser 154 takes the utterance 215 as an additional input along with the intermediate logical form and, thus, determines the logical form 235 based on a combination of the utterance 215 and the intermediate logical form 225. An intermediate logical form 225, also referred to herein as a template, is a frame or template for a corresponding logical form 235. In other words, an intermediate logical form 225 is a more generalized version of a logical form 235.

More specifically, in some embodiments, the coarse semantic parser 152 determines an intermediate logical form 225 that indicates each intent in the corresponding utterance 215 as well as indicating one or more slots for parameters that would refine the details of each intent. In such embodiments, the fine semantic parser 154 determines the values of such parameters so as to refine the intents and thus the overall logical form 235 based on the intermediate logical form 225. The resulting logical form 235 thus includes one or more intents as well as parameters needed to fully express the corresponding utterance 215 being represented in terms of such intents.

Conventionally, a semantic parser subsystem has to learn a mapping from utterances 215 to logical forms 235. Some embodiments described herein divide this mapping into stages, specifically two stages, to enable each of the coarse semantic parser 152 and the fine semantic parser 154 to do only a portion of that task. In a dialog system 100, the coarse semantic parser 152 and the fine semantic parser 154 sit in the place of a semantic parser subsystem, specifically, between an ASR subsystem 108 and a dialog manager subsystem 116. For instance, the utterance 215 input to the coarse semantic parser 152 may have been determined by the ASR subsystem 108, and potentially tagged by the NER subsystem 112, and the logical form 235 output by the fine semantic parser 154 may be input to the dialog manager subsystem 116 for processing.

In some embodiments, each of the coarse semantic parser 152 and the fine semantic parser 154 is implemented as hardware, software, or a combination of both. For instance, each of the coarse semantic parser 152 and the fine semantic parser 154 may be implemented as one or more software functions or as a specialized hardware device, or a combination of these. In some embodiments, the coarse semantic parser 152 is an ML model; for instance, the coarse semantic parser 152 may be a neural network, such as a sequence-to-sequence (seq2seq) model. Further, in some embodiments, the fine semantic parser 154 is an ML model; for instance, the fine semantic parser 154 may be a neural network, such as a seq2seq model.

Figure 3:
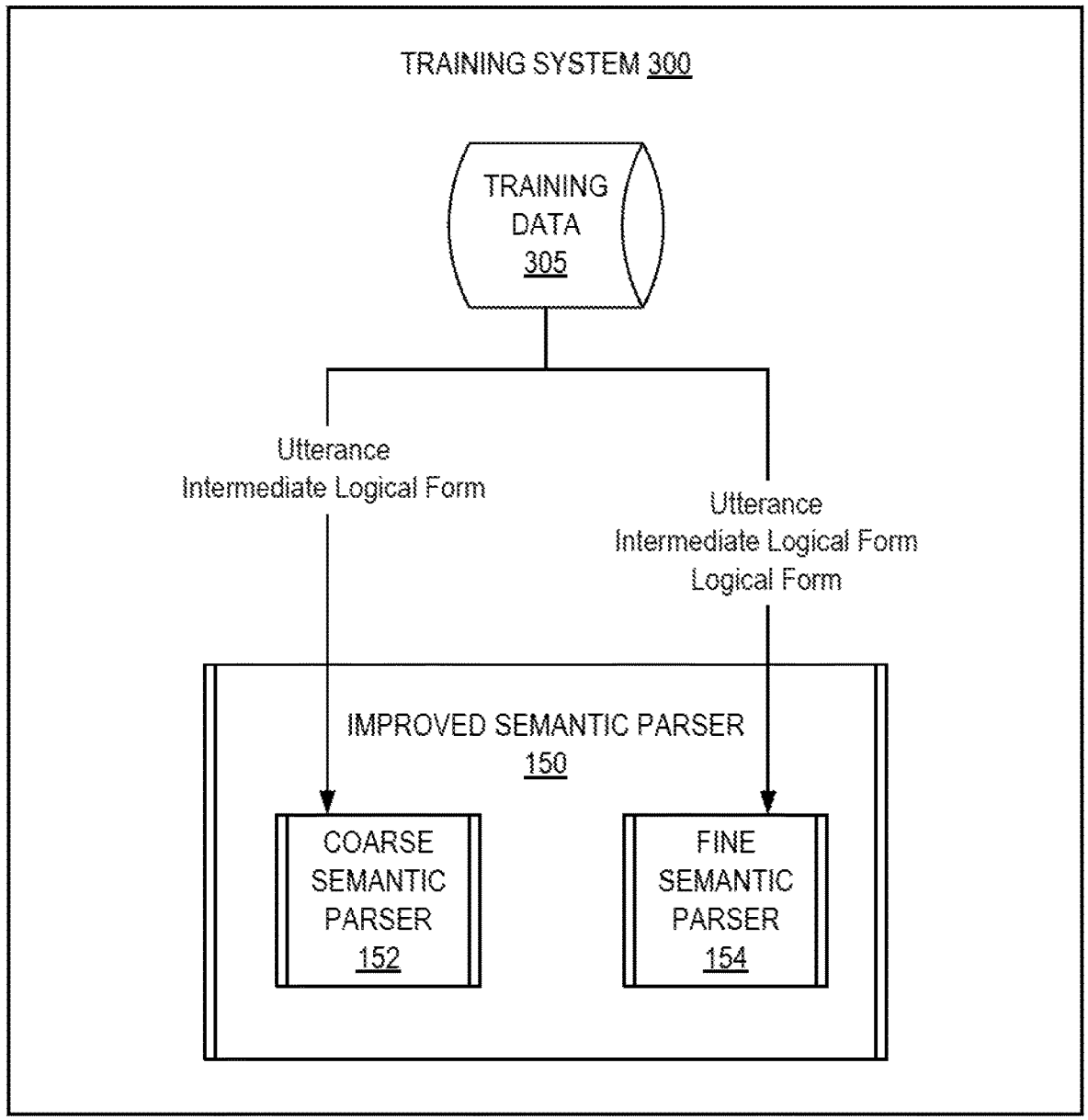
FIG. 3 is a diagram of a training system configured to train the coarse semantic parser and the fine semantic parser to behave as the improved semantic parser for the dialog system, according to some embodiments described herein.

FIG. 3 is a diagram of a training system 300 configured to train two parsers to behave as an improved semantic parser 150 for use in a dialog system, according to certain embodiments. Specifically, the training system 300 may train the coarse semantic parser 152 and the fine semantic parser 154, which together form the improved semantic parser 150. In some embodiments, the training system 300 is implemented as a computing device or portion thereof, such as a server. The training system 300 may be implemented as hardware, software, or a combination of both; more specifically, the training system 300 may be implemented as a specialized hardware device or as program code, or a combination of both. Although the training system 300 is illustrated as a single block of the diagram in FIG. 3, in some embodiments, the training system 300 is distributed across one or multiple functions, devices, or computing systems. For instance, a first computing system of the training system 300 may train the coarse semantic parser 152, and a second computing system of the training system 300 may train the fine semantic parser 154.

Using training data 305 that includes utterances 215, intermediate logical forms 225, and logical forms 235, the training system 300 may train the coarse semantic parser 152 and a fine semantic parser 154. Specifically, the training system 300 may train the coarse semantic parser 152 to map utterances 215 to their corresponding intermediate logical forms 225, and the training system 300 may train the fine semantic parser 154 to map intermediate logical forms 225 to their corresponding logical forms 235 or, in some embodiments, to map combinations of utterances 215 and intermediate logical forms 225 to their corresponding logical forms 235.

The below table provides several examples of utterances 215, their corresponding intermediate logical forms 225, and their corresponding logical forms 235. It will be understood that these examples are for illustrative purposes only and do not limit the various embodiments.

| Utterance | Intermediate Logical Form | Logical Form |
| --- | --- | --- |
| "Send email to Bob saying that the deal is done, and by the way, | [not_followup: [send: [X1], find: [X2]]] | [not_follow_up: [send: [recipient: Bob, method: email, content: "the deal is done"], find: [amenity: |

| Utterance | Intermediate Logical Form | Logical Form |
| --- | --- | --- |
| look for a place for lunch." | | restaurant, time: lunch]]] |
| "Take me to a Japanese restaurant in Bellevue." | [action: [route: *], topic: [from: here, to: X]] | [action: [route: *], topic: [from: here, to: [amenity: restaurant cuisine: Japanese, neighborhood: Bellevue]]] |
| "Send the location of the best Chinese restaurant to Mike." | [action: [send: *], topic: [location: X, to: Mike]] | [action: [send: *], topic: [location: [amenity: restaurant, cuisine: Chinese, selector: highest_rated], to: Mike]] |
| "Which customer in Seattle is referenceable, and tell me their deal's value." | [action: [customer_search: *, deal_search: *], topic: [customer: X]] | [action: [customer_search: *, deal_search: *], topic: [customer: [neighborhood: Seattle, referenceable: yes]]] |

Generally, the intermediate logical form 225 may follow a first language, which is less detailed (i.e., coarser) than a second language to which logical forms 235 comply. In the above example, X, X1, and X2 are characters output by the coarse semantic parser 152 to represent parameters, or arguments, the values of which are generated by the fine semantic parser 154 and thus shown in the logical form 235. Thus, the first language may be a subset of the second language, such that variables are used in the first language to replace details that cannot be expressed in the first language. Such details may then be determined by the fine semantic parser 154 and incorporated into a resulting logical form 235.

More specifically, in some embodiments, the coarse semantic parser 152 is trained to determine an intermediate logical form 225 that indicates each intent in the corresponding utterance 215 as well as indicating one or more slots for parameters that would refine the details of each such intent. In such embodiments, the intermediate logical form 225 thus indicates one or more intents and provides slots for the fine semantic parser 154 to fill with values of parameters. As such, the fine semantic parser 154 is trained to determine the values of such parameters so as to refine the logical form 235 based on the intermediate logical form 225. The resulting logical form 235 thus includes one or more intents as well as parameters needed to fully express the corresponding utterance 215 being represented in terms of such intents.

Figure 4:
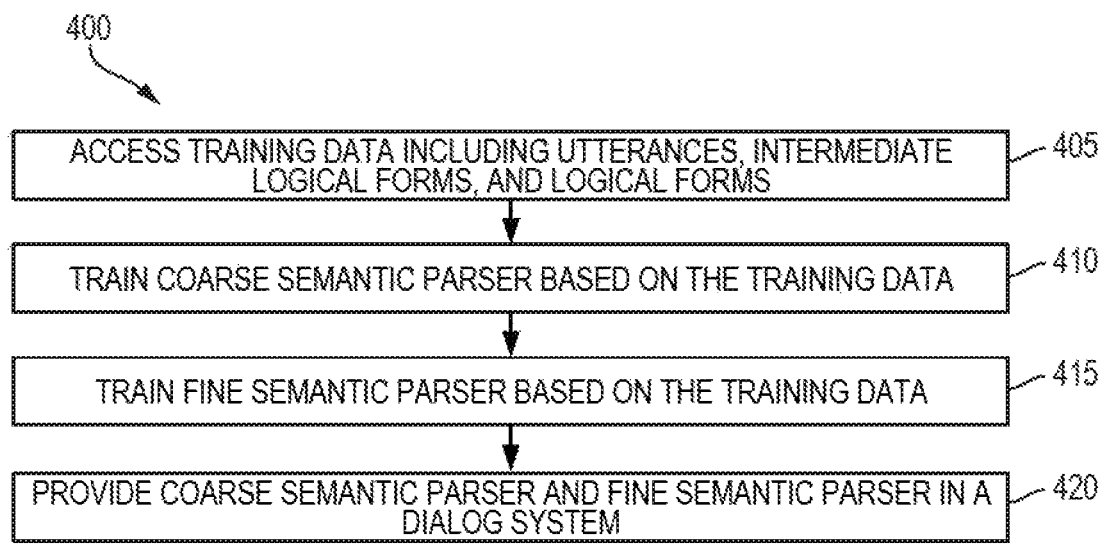
FIG. 4 is a diagram of a method of training the improved semantic parser in a dialog system, according to some embodiments described herein.

FIG. 4 is a diagram of a method 400 of training the improved semantic parser 150 or, in other words, training the coarse semantic parser 152 and the fine semantic parser 154, according to some embodiments described herein. In some embodiments, the training system 300 utilizes this method 400 or similar to train the improved semantic parser 150 prior to operation of the coarse semantic parser 152 and the fine semantic parser 154 in the dialog system 100.

The method 400 depicted in FIG. 4, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 400 is intended to be illustrative and non-limiting. Although FIG. 4 depicts various activities occurring in a particular sequence or order, this is not intended to be limiting. In certain embodiments, for instance, the activities may be performed in a different order, or one or more activities of the method 400 may be performed in parallel. In certain embodiments, the method 400 may be performed by the training system 300.

As shown in FIG. 4, at block 405, the training system 300 accesses a set of training data 305, which may be used to train the coarse semantic parser 152 and the fine semantic parser 154. The training data 305 may include a set of tuples, each tuple including an utterance 215, an intermediate logical form 225 corresponding to the utterances 215, and a logical form 235 corresponding to the utterance 215 and the intermediate logical form 225. Various techniques exist for accessing this training data 305, and the training system 300 may use one or more of such techniques.

For instance, the training data 305 may be generated manually at least in part, such as through crowdsourcing. In one example, a set of logical forms 235 is generated automatically based on a grammar for logical forms 235, or a set of logical forms 235 is generated manually by a team based on the grammar for logical forms 235. As described above, in some embodiments, an intermediate logical form 225 specifies one or more intents as well as, for each intent, one or more slots to be filled. Because logical forms 235 are designed to be easily parseable to enable processing by the dialog manager subsystem 116, an automated process may be used to identify intents and slots in the logical forms 235. As such, the automated process may remove parameter values from the slots, thus producing a corresponding intermediate logical form 225 for each logical form 235. Each logical form 235 is then paired with its corresponding intermediate logical form 225.

In some embodiments, the pairs of logical forms 235 and intermediate logical forms 225 are then provided to a group of people (i.e., a crowd), which manually determines one or more utterances 215 corresponding to each pair of an intermediate logical form 225 and a logical form 235. A crowd may be useful for determining utterances 215, rather than for determining logical forms 235, because people may be more familiar with natural language than with the grammar of logical forms 235; however, members of the crowd are expected to be comfortable enough with the grammar of logical forms 235 to be able to interpret the logical forms 235 provided.

Because natural language provides multiple ways to convey information, the crowd may in some cases determine multiple utterances for a pair of an intermediate logical form 225 and a logical form 235. Each utterance 215 may be combined with its corresponding intermediate logical form 225 and logical form 235 in a tuple included in the training data 305. If multiple utterances 215 are produced for a pair, then each such utterance 215 may be combined in its own respective tuple along with the pair to which that utterance 215 corresponds.

The various tuples of utterances 215, intermediate logical forms 225, and logical forms 235 may be saved as training data 305. The training system 300 may then be given access to the resulting training data 305. For instance, an administrator may copy the training data 305 to a memory device accessible by the training system 300.

Figure 5:
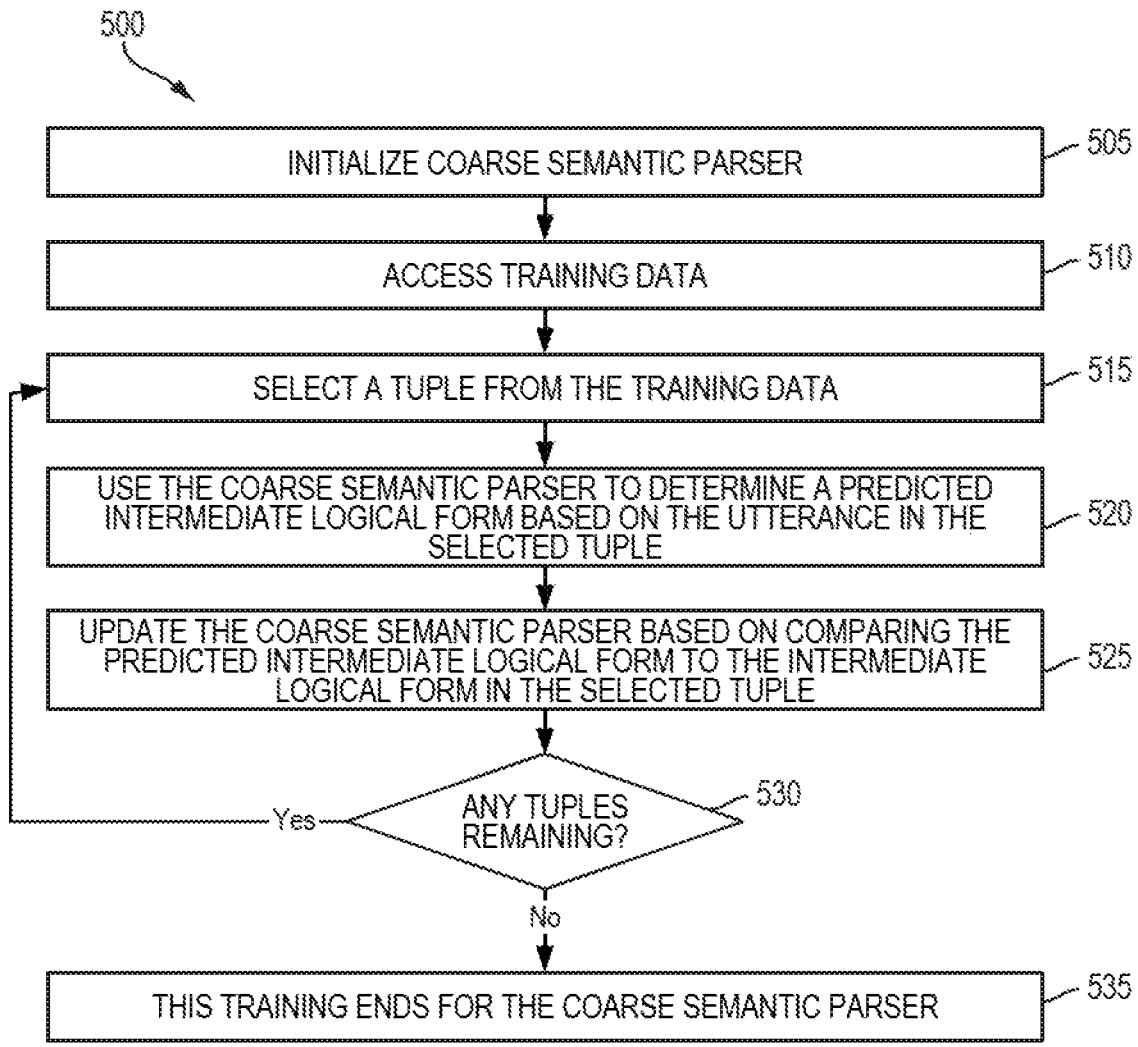
FIG. 5 is a diagram of a method of training the coarse semantic parser of the improved semantic parser, according to some embodiments described herein.

At block 410, the training system 300 trains the coarse semantic parser 152 based on the training data 305. In some embodiments, the training system 300 trains the coarse semantic parser 152 using, for each pair of an utterance and an intermediate logical form 225 in a tuple, the utterance 215 labeled as input and the intermediate logical form 225 labeled as output. Additional details of training of the coarse semantic parser 152 in some embodiments are shown in FIG. 5 and described further below.

Figure 6:
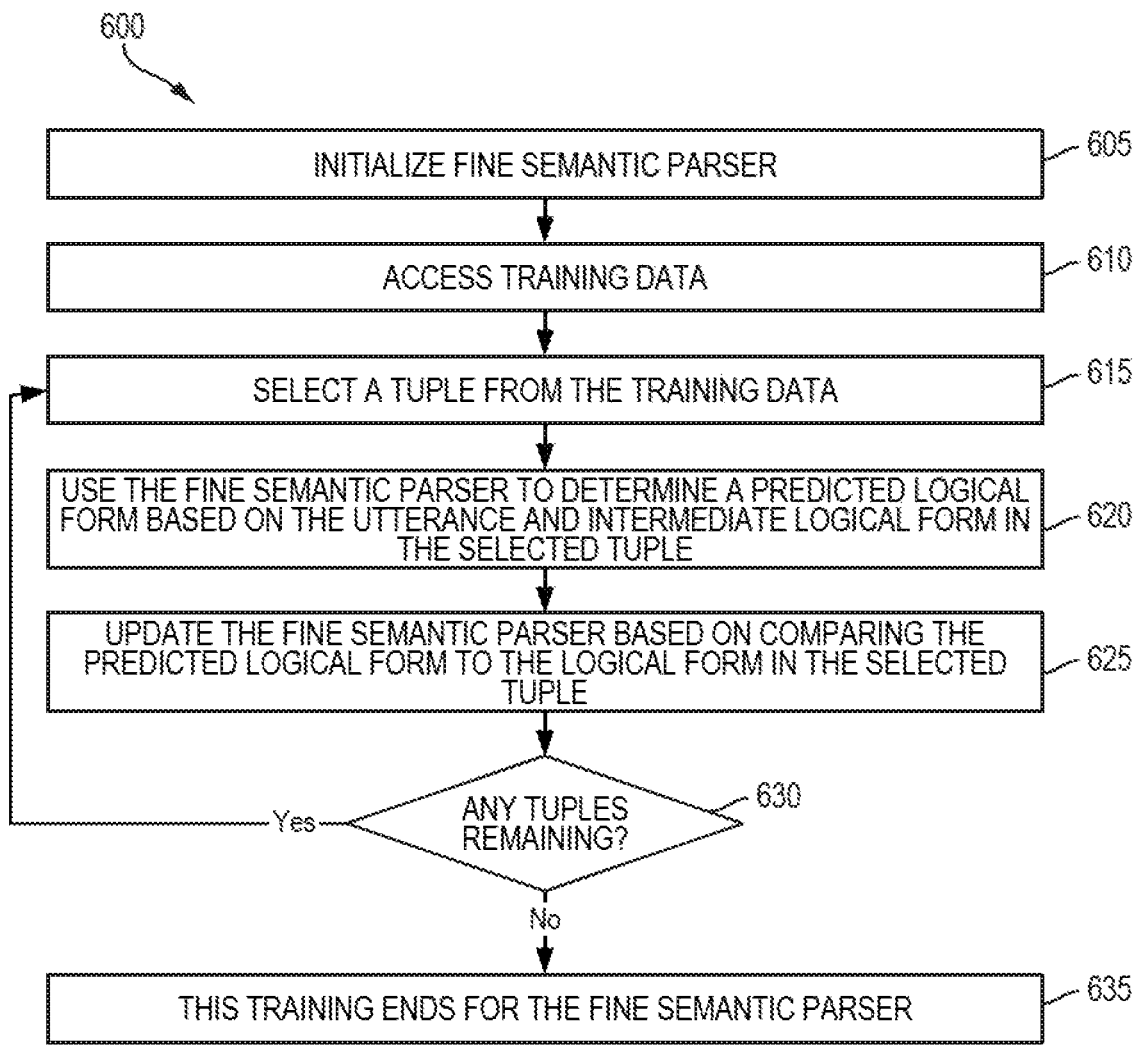
FIG. 6 is a diagram of a method of training the fine semantic parser of the improved semantic parser, according to some embodiments described herein.

At block 415, the training system 300 trains the fine semantic parser 154 based on the training data 305. In some embodiments, the training system 300 trains the fine semantic parser 154 using, for each tuple, the utterance 215 and intermediate logical form labeled as input and the logical form 235 labeled as output. Additional details of training of the fine semantic parser 154 in some embodiments are shown in FIG. 6 and described further below.

Although block 410 is performed before block 415 in this example, it will be understood that this ordering is for illustrative purposes only. In some embodiments, for instance, the training system 300 may train the fine semantic parser 154 before the coarse semantic parser 152, or the coarse semantic parser 152 and the fine semantic parser 154 may be trained in parallel.

At block 420, the training system 300 provides the coarse semantic parser 152 and the fine semantic parser 154 in a dialog system 100. For instance, if the training system 300 and the dialog system 100 are executed on the same computing system, then the training system 300 updates the coarse semantic parser 152 and the fine semantic parser 154 during training, such that the dialog system 100 can access the trained coarse semantic parser 152 and fine semantic parser 154. Additionally or alternatively, an administrator may copy the coarse semantic parser 152 and the fine semantic parser 154 to a memory device accessible by the dialog system 100, thus enabling the dialog system 100 to use the coarse semantic parser 152 and the fine semantic parser 154. In the dialog system, the coarse semantic parser 152 and the fine semantic parser 154 may be used in series in place of a conventional semantic parser.

FIG. 5 is a diagram of a method 500 of training the coarse semantic parser 152 of the improved semantic parser 150, according to some embodiments described herein. In some embodiments, the training system 300 utilizes this method 500 or similar at block 410 of the above method 400. The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the training system 300.

At block 505, the training system 300 initializes the coarse semantic parser 152. Generally, training a neural network, such the coarse semantic parser 152 in some embodiments, involves using a training dataset, such as the training data 305, to update weights of nodes in the neural network to create a good mapping of inputs to outputs. To this end, a loss function is used during training to compare output from the neural network to expected output. Output from the loss function is used to update the weights in the neural network, thereby training the neural network or, in other words, causing the neural network to learn a desired mapping. In this case, the desired mapping for the coarse semantic parser 152 is a mapping from utterances 215 to intermediate logical forms 225. To initialize the coarse semantic parser 152 for training, in some embodiments, the training system 300 may select a respective initial weight for each node in the neural network behaving as the coarse semantic parser 152.

At block 510, the training system 300 accesses the training data 305. As described above, the training data 305 may include tuples, each tuple including an utterance 215 and an intermediate logical form 225. Although the training data 305 may also include logical forms 235 in the tuples, training of the coarse semantic parser 152 does not require the logical forms 235 in some embodiments, and the training system 300 may ignore the logical forms 235 while training the coarse semantic parser 152.

At block 515, the training system 300 selects a tuple from the training data 305, where the selected tuple has not yet been considered during training, or during a current round of training if multiple rounds (i.e., restarts) are being used. Block 515 begins an iterative loop in which each tuple of the training data 305 is considered, with a selected tuple being considered per iteration of the loop.

At block 520, the training system 300 utilizes the coarse semantic parser 152 to determine a predicted intermediate logical form based on input equal to the utterance 215 in the selected tuple. In other words, in some embodiments, the training system 300 provides the utterance 215 from the selected tuple as input to the coarse semantic parser 152, which predicts a predicted intermediate logical form based on the utterance 215.

At block 525, the training system 300 updates the coarse semantic parser 152 based on a comparison of the predicted intermediate logical form to the intermediate logical form 225 in the selected tuple. For example, comparing the predicted intermediate logical form to the intermediate logical form 225 can include applying a loss function to the predicted intermediate logical form and the intermediate logical form 225, such that the output of the loss function represents a variance between the values. In some embodiments, the intermediate logical form 225 in the selected tuple is the expected output for the utterance 215 as input, and thus, the training system 300 modifies the coarse semantic parser 152 based on a variance between the predicted intermediate logical form, as predicted by the coarse semantic parser 152, and the intermediate logical form 225, which is the correct output.

At decision block 530, the training system 300 determines whether any tuples remain for consideration in the training data 305. If such a tuple remains, then the method 500 returns to block 515 to select another tuple. However, if no such tuple remains for consideration, then the method 500 proceeds to block 535. At block 535, this training ends, and the coarse semantic parser 152 is ready for use in the dialog system 100. The coarse semantic parser 152 has learned a mapping from utterances 215 to their corresponding intermediate logical forms 225.

The above method 500 is a simplified method for training the coarse semantic parser 152, and various modifications may be made to the techniques therein. For instance, rather than updating the coarse semantic parser 152 after processing of each tuple through the coarse semantic parser 152, the training system 300 may update the coarse semantic parser 152 based on batches of tuples. Further, the training system 300 may implement one or more restarts during training, where each restart includes reinitializing the weights of the coarse semantic parser 152 to new initial values so as to determine if the mapping learned can be improved by different weights used at initialization. Various other changes may be made additionally or alternatively to these.

FIG. 6 is a diagram of a method 600 of training the fine semantic parser 154 of the improved semantic parser 150, according to some embodiments described herein. In some embodiments, the training system 300 utilizes this method 600 or similar at block 415 of the above method 400. The method 600 depicted in FIG. 6, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 600 is intended to be illustrative and non-limiting. Although FIG. 6 depicts various activities occurring in a particular sequence or order, this is not intended to be limiting. In certain embodiments, for instance, the activities may be performed in a different order, or one or more activities of the method 600 may be performed in parallel. In certain embodiments, the method 600 may be performed by the training system 300.

At block 605, the training system 300 initializes the fine semantic parser 154. Generally, training a neural network, such the fine semantic parser 154 in some embodiments, involves using a training dataset, such as the training data 305, to update weights of nodes in the neural network to create a good mapping of inputs to outputs. To this end, a loss function is used during training to compare output from the neural network to expected output. Output from the loss function is used to update the weights in the neural network, thereby training the neural network or, in other words, causing the neural network to learn a desired mapping. In this case, the desired mapping for the fine semantic parser 154 is a mapping from utterances 215 to intermediate logical forms 225. To initialize the fine semantic parser 154 for training, in some embodiments, the training system 300 may select a respective initial weight for each node in the neural network behaving as the fine semantic parser 154.

At block 610, the training system 300 accesses the training data 305. As described above, the training data 305 may include tuples, each tuple including an intermediate logical form 225 and a logical form 235. The training data 305 may also include utterances 215 in the tuples, and training of the fine semantic parser 154 may or may not use those utterances 215 as well. Some embodiments of the fine semantic parser 154 are configured, such as based on the training described herein, to map a pair of an utterance 215 and an intermediate logical form 225 to a corresponding logical form 235, and in that case, the training system 300 may train the fine semantic parser 154 using utterances 215, intermediate logical forms 225, and logical forms 235. However, some embodiments of the fine semantic parser 154 are configured, such as based on the training described herein, to map an intermediate logical form 225 to a corresponding logical form 235, and in that case, the training system 300 may train the fine semantic parser 154 using intermediate logical forms 225 and logical forms 235 but without using utterances 215 in some embodiments.

At block 615, the training system 300 selects a tuple from the training data 305, where the selected tuple has not yet been considered during training, or during a current round of training if multiple rounds (i.e., restarts) are being used. Block 615 begins an iterative loop in which each tuple of the training data 305 is considered, with a selected tuple being considered per iteration of the loop.

At block 620, the training system 300 utilizes the fine semantic parser 154 to determine a predicted logical form based on input equal to the intermediate logical form 225, and also the utterance 215 in some embodiments, from the selected tuple. In other words, in some embodiments, the training system 300 provides the intermediate logical form 225 from the selected tuple, or the utterance 215 and the intermediate logical form 225, as input to the fine semantic parser 154, which predicts a predicted logical form based on that input.

At block 625, the training system 300 updates the fine semantic parser 154 based on a comparison of the predicted logical form to the logical form 235 in the selected tuple. For example, comparing the predicted logical form to the logical form 235 can include applying a loss function to the predicted logical form and the logical form 235, such that the output of the loss function represents a variance between the values. In some embodiments, the logical form 235 in the selected tuple is the expected output for the given input (i.e., the intermediate logical form 225 or, alternatively, the utterance 215 and the intermediate logical form 225). Thus, the training system 300 modifies the fine semantic parser 154 based on a variance between the predicted logical form, as predicted by the fine semantic parser 154, and the logical form 235, which is the correct output.

At decision block 630, the training system 300 determines whether any tuples remain for consideration in the training data 305. If such a tuple remains, then the method 600 returns to block 615 to select another tuple. However, if no such tuple remains for consideration, then the method 600 proceeds to block 635. At block 635, this training ends, and the fine semantic parser 154 is ready for use in the dialog system 100. The fine semantic parser 154 has learned a mapping from utterances 215 and intermediate logical forms 225 to their corresponding logical forms 235.

The above method 600 is a simplified method for training the fine semantic parser 154, and various modifications may be made to the techniques therein. For instance, rather than updating the fine semantic parser 154 after each processing of each tuple through the fine semantic parser 154, the training system 300 may update the fine semantic parser 154 based on batches of tuples. Further, the training system 300 may implement one or more restarts during training, where each restart includes reinitializing the weights of the fine semantic parser 154 to new initial values so as to determine if the mapping learned can be improved by different weights used at initialization. Various other changes may be made additionally or alternatively to these.

Figure 7:
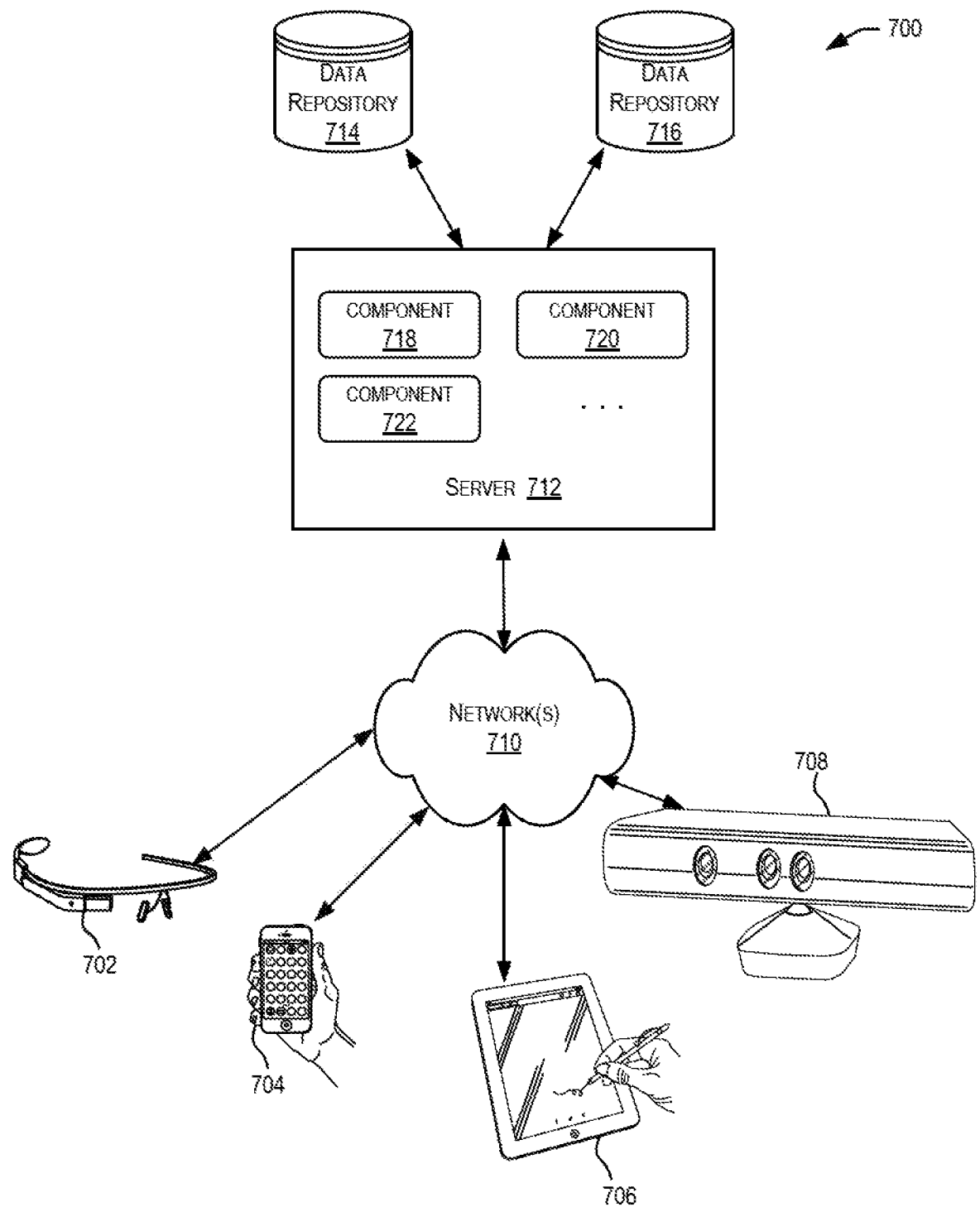
FIG. 7 is a diagram of a distributed system for implementing some embodiments described herein.

FIG. 7 is a simplified diagram of a distributed system 700 for implementing certain embodiments. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to nm one or more services or software applications that enable training of a coarse semantic parser 152 or a fine semantic parser 154 or use of the coarse semantic parser 152 or the fine semantic parser 154 in a dialog system 100 as described herein. For instance, server 712 may execute some or all aspects of the training system 300 or some or all aspects of the dialog system 100.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components. More specifically, for instance, each of client computing devices 702, 704, 706, and/or 708 may be an embedded device configured to execute the dialog system 100 and, further, configured to communicate with server 712 to enable server 712 to train a coarse semantic parser 152 or a fine semantic parser 154 or to use the coarse semantic parser 152 or the fine semantic parser 154 in a dialog system 100.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to interact with aspects of the dialog system 100 provided by server 712 in accordance with the teachings of this disclosure. A client device may provide an interface (e.g., a speech interface) that enables a user of the client device to interact with the client device. The client device may also output information to the user via this interface. Although FIG. 7 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture). IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase® IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of data repositories 714, 716 may be used to store training data 305 or other data required to train a coarse semantic parser 152 or a fine semantic parser 154 or to use the coarse semantic parser 152 or the fine semantic parser 154 in a dialog system 100. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
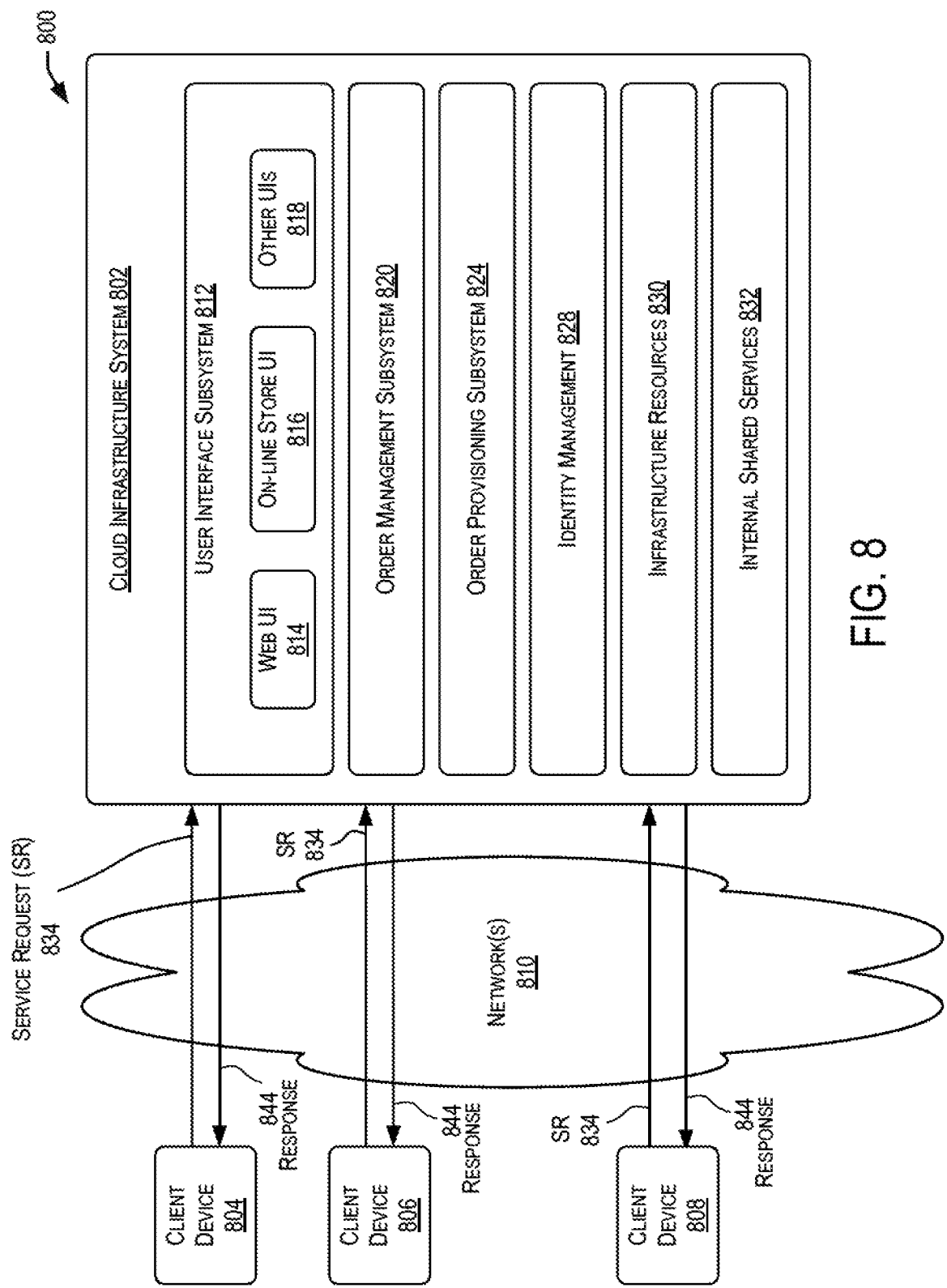
FIG. 8 is a diagram of a cloud-based system environment in which training the two parsers to behave as an improved semantic parser may be offered at least in part as a cloud service, according to some embodiments described herein.

In certain embodiments, all or a portion of training or using a coarse semantic parser 152 or a fine semantic parser 154 of a dialog system 100, as described herein, may be offered as services via a cloud environment. FIG. 8 is a simplified block diagram of a cloud-based system environment in which training the semantic parser 130, as described herein, may be offered at least in part as a cloud service, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between client computing devices 804, 806, and 808 and cloud infrastructure system 802. Network (s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a customer may subscribe to information services or other services provided by the dialog system 100 in conversational form. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client computing device to interact with cloud infrastructure system 802, such as to request a service provided by cloud infrastructure system 802. An attacker may use a client device to send malicious requests.

In some embodiments, the processing performed by cloud infrastructure system 802 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for providing training or use of a coarse semantic parser 152 or a fine semantic parser 154 as described herein. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the infrastructure resources 830 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and that facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke an order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
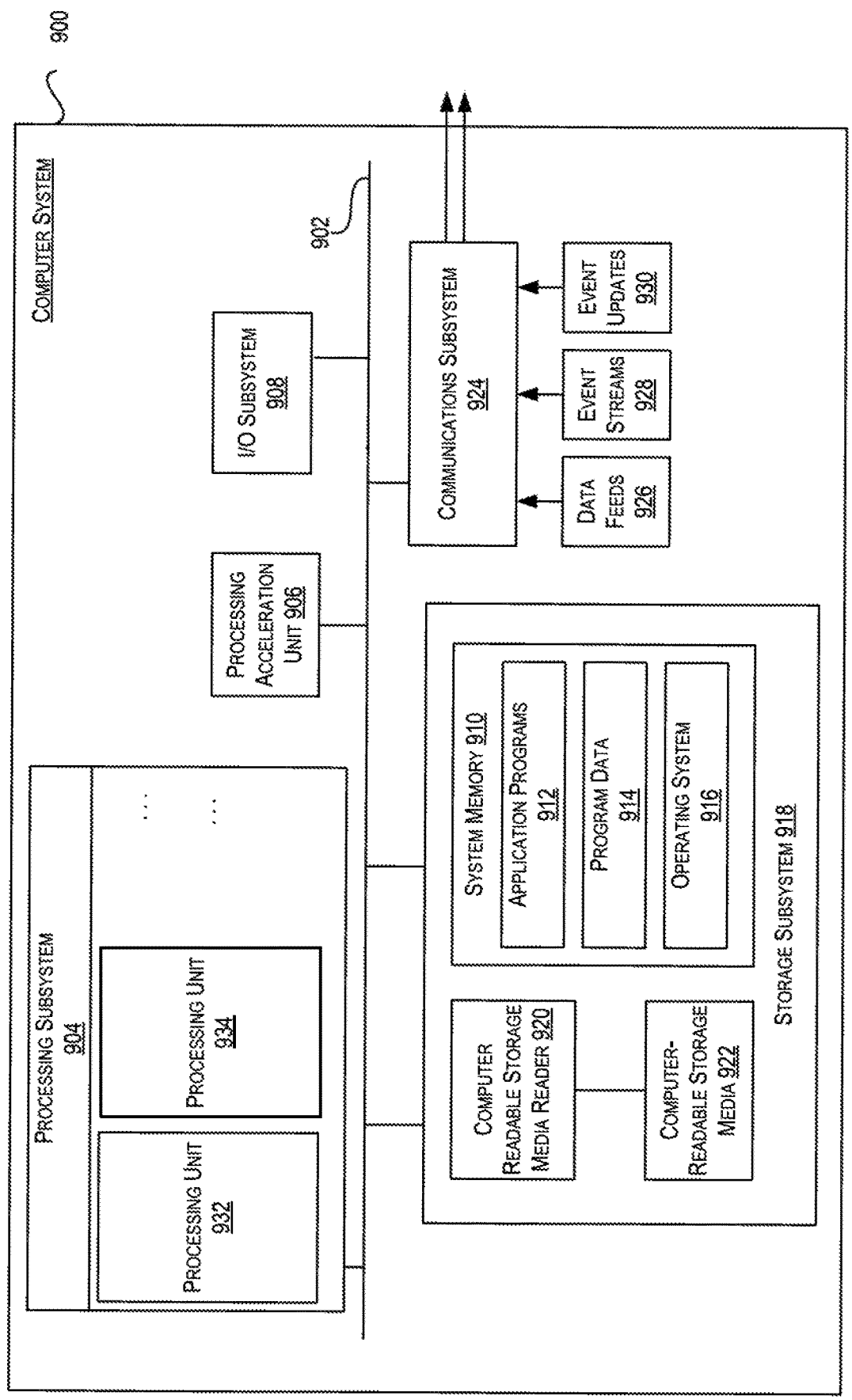
FIG. 9 is a diagram of an example computer system that may be used to implement some embodiments described herein.

FIG. 9 is a block diagram of an example computer system 900 that may be used to implement certain embodiments. For example, in some embodiments, computer system 900 may be used to implement any of systems, subsystems, and components described herein. For example, multiple host machines may provide and implement training or use of a coarse semantic parser 152 or a fine semantic parser 154 of a dialog system 100 as described herein. Computer systems such as computer system 900 may be used as host machines. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer-readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

Byway of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing training or use of a coarse semantic parser 152 or fine semantic parser 154 of a dialog system 100, as described herein, may be executed in system memory 910.

Computer-readable storage media 922 may store programming and data constructs that provide the functionality of some embodiments. Computer-readable storage media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores). I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook®, updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   accessing training data comprising utterances, intermediate logical forms, and logical forms;
   using a coarse semantic parser to determine predicted intermediate logical forms based on the utterances in the training data;
   training the coarse semantic parser by updating the coarse semantic parser based on comparing the predicted intermediate logical forms to the intermediate logical forms in the training data;
   using a fine semantic parser to determine predicted logical forms based on the utterances and the intermediate logical forms in the training data; and
   training the fine semantic parser by updating the fine semantic parser based on comparing the predicted logical forms to the logical forms in the training data;
   using the coarse semantic parser to determine an intermediate logical form for an utterance of a dialog system, wherein the utterance is a text-based natural language expression, and wherein the intermediate logical form indicates one or more intents in the utterance; and
   using the fine semantic parser to determine a logical form for the utterance and the intermediate logical form, wherein the logical form is a syntactic expression of the utterance according to an established grammar, and wherein the logical form comprises one or more parameters of the one or more intents; and using the logical form to conduct a dialog through the dialog system.

2. The method of claim 1, wherein applying the fine semantic parser to the intermediate logical form to determine the logical form for the utterance comprises applying the fine semantic parser to the utterance and the intermediate logical form to determine the logical form for the utterance.

3. The method of claim 1, wherein the coarse semantic parser is a machine learning model.

4. The method of claim 3, wherein the fine semantic parser is a machine learning model.

5. The method of claim 1, wherein the coarse semantic parser is a sequence-to-sequence neural network, and wherein the fine semantic parser is an additional sequence-to-sequence neural network.

6. The method of claim 1, further comprising:

receiving speech input in the dialog system; and converting the speech input to the utterance using automatic speech recognition.

7. The method of claim 6, further comprising:

analyzing the logical form to generate a response text responsive to the speech input; and determining an audio output of the dialog system by applying text-to-speech to the response text.

8. A system comprising:

a coarse semantic parser configured to:

access an utterance received in a dialog system, wherein the utterance is a text-based natural language expression; and determine, based on the utterance, an intermediate logical form for the utterance, wherein the intermediate logical form indicates one or more intents in the utterance;

a fine semantic parser configured to:

determine, based on the intermediate logical form, a logical form for the utterance and the intermediate logical form, wherein the logical form is a syntactic expression of the utterance according to an established grammar, and wherein the logical form comprises one or more parameters of the one or more intents, wherein the logical form is useable to conduct a dialog through the dialog system; and a training system configured to:

access training data comprising utterances, intermediate logical forms, and logical forms;

using a coarse semantic parser to determine predicted intermediate logical forms based on the utterances in the training data;

training the coarse semantic parser by updating the coarse semantic parser based on comparing the predicted intermediate logical forms to the intermediate logical forms in the training data;

using a fine semantic parser to determine predicted logical forms based on the utterances and the intermediate logical forms in the training data; and training the fine semantic parser by updating the fine semantic parser based on comparing the predicted logical forms to the logical forms in the training data.

9. The system of claim 8, wherein the fine semantic parser determines the logical form based on both the utterance and the intermediate logical form.

10. The system of claim 8, wherein the coarse semantic parser is a sequence-to-sequence neural network.

11. The system of claim 10, and wherein the fine semantic parser is an additional sequence-to-sequence neural network.

12. The system of claim 8, further comprising an automatic speech recognition subsystem configured to:

receive speech input; and convert the speech input to the utterance using automatic speech recognition.

13. The system of claim 12, further comprising:

a dialog manager subsystem configured to analyze the logical form to generate a response text responsive to the speech input; and a text-to-speech subsystem configured to determine an audio output of the system by applying text-to-speech to the response text.

\* \* \* \* \*

UNITED STATES PATENT AND TRADEMARK OFFICE
CERTIFICATE OF CORRECTION

PATENT NO. : 11,501,065 B2
APPLICATION NO. : 16/992343
DATED : November 15, 2022
INVENTOR(S) : Duong et al.

It is certified that error appears in the above-identified patent and that said Letters Patent is hereby corrected as shown below:

In the Specification

In Columns 7-8 (TABLE), Line 2, delete "follow_up:" and insert -- followup: --, therefor.

In Columns 9-10 (TABLE-continued), Line 5, delete "restaurant" and insert -- restaurant, --, therefor.

In Column 14, Line 65, delete "nm" and insert -- run --, therefor.

In Column 16, Lines 42-43, delete "Sybase®" and insert -- Sybase®, --, therefor.

In Column 22, Line 49, delete "Siri" and insert -- Siri® --, therefor.

In Column 24, Line 61, delete "evolution)," and insert -- evolution)), --, therefor.

In the Claims

In Column 28, Line 39, in Claim 13, delete "system" and insert -- dialog system --, therefor.

Signed and Sealed this
Twentieth Day of June, 2023

Katherine Kelly Vidal
*Director of the United States Patent and Trademark Office*